H. J. PIEPGRAS.
GRAIN POLISHING MACHINE.
APPLICATION FILED OCT. 7, 1916.
1,240,775.
Patented Sept. 18, 1917.
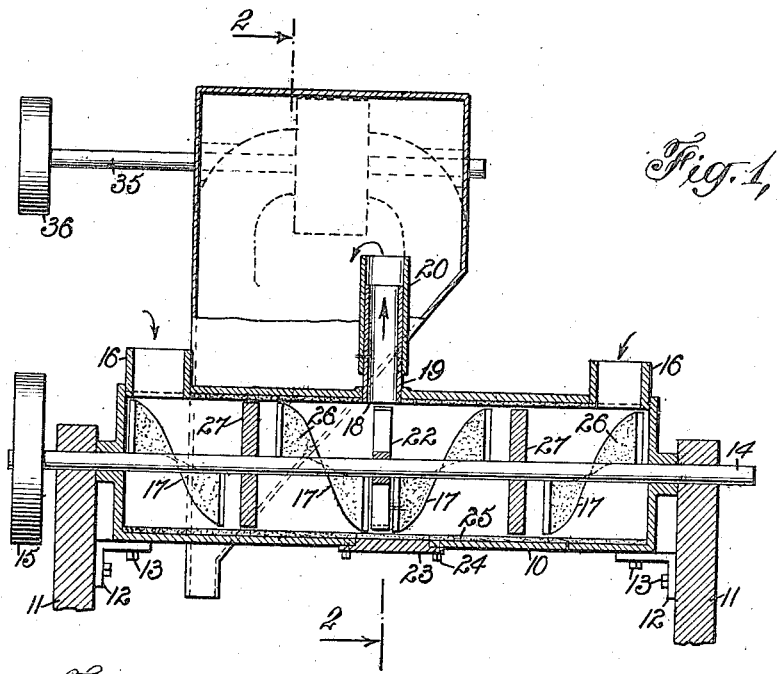
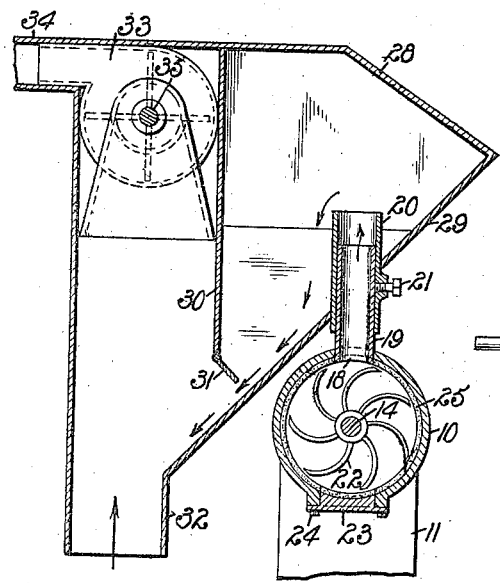
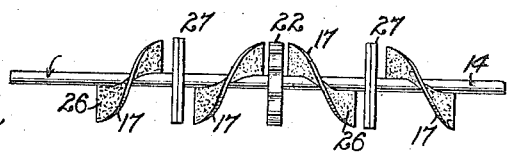
WITNESSES
INVENTOR
Herman J. Piepgras
BY
ATTORNEYS

UNITED STATES PATENT OFFICE.

HERMAN J. PIEPGRAS, OF CALDWELL, IDAHO.

GRAIN-POLISHING MACHINE.

1,240,775. Specification of Letters Patent. Patented Sept. 18, 1917.

Application filed October 7, 1916. Serial No. 124,247.

*To all whom it may concern:*

Be it known that I, HERMAN J. PIEPGRAS, a citizen of the United States, and a resident of Caldwell, in the county of Canyon and State of Idaho, have invented a new and Improved Grain-Polishing Machine, of which the following is a full, clear, and exact description.

General objects of my invention are to provide a machine having the maximum efficiency in thoroughly and expeditiously effecting the polishing of the grain; to provide a machine in which the outlet for the grain is in the form of a stand pipe whereby to oppose to the advancing grain in the polishing cylinder the pressure of a column of grain at the outlet; to provide for varying the height of the stand pipe outlet and thus vary the head or pressure opposing the advance of the grain toward the outlet; and to provide for spouting the discharged grain in a manner to insure the effective separation of the dust, smut, etc., from the polished grain through the medium of an air current.

More specific objects of the invention are to provide an effective agitating, polishing and conveying means and an effective means to force the polished grain through the outlet against the head or pressure produced by the column of escaping grain, as well as to simplify the construction of machines of this character.

Other objects of the invention and the advantages of the preferred embodiment of the invention will appear as the description proceeds.

Reference is to be had to the accompanying drawings forming a part of this specification in which similar reference characters indicate corresponding parts in all the views.

Figure 1 is a longitudinal vertical section of a grain-polishing machine embodying my invention;

Fig. 2 is a transverse vertical section on the line 2—2, Fig. 1;

Fig. 3 is a side elevation of the conveying and agitating means in the polishing cylinder;

Fig. 4 is a detail in transverse section of one of the devices provided on the feed shaft for breaking up the mass of advancing grain between the separate flights of the feed screw.

In carrying out my invention in accordance with the illustrated example, a polishing cylinder 10 is provided mounted on any suitable supporting structure. The supporting structure may comprise standards 11 to which the cylinder 10 is secured in any suitable manner as by brackets 12 and bolts 13.

Axially of the fixed cylinder 10 is disposed a shaft 14 having suitable bearings in the standards 11 or otherwise, and provided with any approved driving means such as a pulley 15 to be belted to any suitable source of power (not shown). The material is adapted to be fed by any suitable means to inlets 16 provided at each end of the cylinder 10. On the shaft 14 are spiral flights 17 constituting a feed screw and these are reversely disposed for advancing the grain from the respective inlets 16 toward a central discharge outlet 18 in the cylinder 10.

In order that the head or pressure of a column of grain at the outlet 18 may be opposed to the advancing grain in the cylinder 10, the outlet 18 is produced in the top of the cylinder and there is provided in connection with the latter at said outlet a stand pipe 19. For varying the height of the stand pipe and therefore the head of the column of grain, the upper portion 20 of the stand pipe is made telescoping and adapted to be secured at any adjusted height by a set screw 21 or equivalent means.

Those flights 17 adjacent to the outlet 18 are contiguous and the effective planes thereof converge to constitute in effect a wedge so that the grain will be crowded to the center of the cylinder, but instead of being clogged and massed, the collecting grain will be continuously turned by the contiguous revolving flights, the adjacent ends of the said contiguous flights being at opposite sides of the axis of the column of grain formed jointly by the stand pipe 19 and the center of the cylinder 10.

In order to positively force the grain upwardly into the stand pipe 19 against the pressure of the grain column a revolving ejecting device 22 is provided on the shaft 14 of the feed screw, directly beneath the stand pipe 19 and between the contiguous central flights 17. Said ejecting device 22 advantageously may take the form as shown of a wheel with curved blades, the free ends of which turn adjacent to the walls of the cylinder 10 so as to successively wipe past the outlet 18.

At the bottom of the cylinder at the center a clean-out opening is presented and normally closed by a plug or cap 23, suitably secured as by bolts or screws 24.

The interior of the cylinder 10 is made to present a roughened polishing surface which is preferably provided by cementitious coating 25. Similarly, a roughened surface is provided on the flights 17 through the medium of a cementitious coating 26.

The flights 17 at each side of the center are non-continuous, the separate flight elements being separated on the shaft 14, and in order to break up the continuity of the grain movement toward the center, transverse breaking bars 27 are provided on the shaft between the respective flight elements and are preferably formed with beveled edges.

The described construction and arrangement of the feed screw and its appurtenances as well as the arrangement of the inlets and outlet prevent the mere crowding of the grain from the inlets toward the outlet. The opposed contiguous flights of the screw and the ejecting device 22 as well as the intermediate breaking elements 27 and the separated flights 17 coöperate to effect the maximum agitation or turning over of the grain, the result being that an effective polishing is produced by the rubbing of the grains together and the contact of the grain with the various surfaces within the cylinder.

The grain is caused to spout vertically from the upper end of the stand pipe into any suitable housing 28 having an inclined bottom 29 onto which the spouted grain falls in all directions. The grain will thus be thoroughly loosened up to readily part with the dust, smut, etc. A vertical partition 30 is provided in the housing 28 dividing the same into two chambers, and at the bottom of the partition 30 is a suitable gate 31 to regulate the distance between the partition and the inclined bottom 29.

The bottom 29 leads to a drop spout from which the grain escapes by gravity and in the said outlet spout 32 an upward current of air is produced to thereby move in the opposite direction to the falling grain. Any suitable means may be employed to produce the upward air current there being conventionally indicated a fan 33 in the top of the housing 28 at the opposite side of the partition 30 from the stand pipe. The numeral 34 indicates the outlet from the fan 33 and the numeral 35 indicates a fan shaft to be driven in any suitable manner, there being indicated a belt pulley 36 on said shaft.

It is to be noted that the shaft 14 is of relatively small cross section area as compared with the cylinder, so that the major portion of the total content of the cylinder may be maintained filled with a mass of material to be polished under the influence of the head due to the vertical stand pipe and the advancing and agitating means. Also, the flights 17 are correspondingly wide to present broad surfaces to the material for gently advancing and turning the same without producing grinding action against the cylinder as is done by revolving drums, or the like, in close relation to a cylinder or shell. The described construction is particularly adapted for small grain and seeds, including alfalfa which has been treated by the machine with marked success. The separated oppositely disposed and convergent central flights 17, with the interposed wheel 22 having the separated blades thereon curved in the plane of rotation of the wheel, prevents the jamming and bruising of the grain or seed at the base of the stand pipe, by preventing the formation of a jammed wedge of grain. It is to be observed also, that the grain is spouted in loose form into a closed chamber out of the influence of the air current to thoroughly loosen up the grain and permit it to undergo a preliminary separation from the dust and chaff before passing down the incline 29 to the active area subject to the separating air current.

Having thus described my invention I claim as new, and desire to secure by Letters Patent:

1. A polishing machine for grain and seeds, including a fixed cylinder having inlets at both sides of the center and having a central outlet at the top, a stand pipe through which the material passes from the said outlet, a relatively small shaft turning in the cylinder leaving an ample space in the cylinder to receive a mass of material between the shaft and cylinder, separate individual spiral flights on the cylinder shaft and oppositely disposed at each side of the center, those flights adjacent to the center being convergent but having their terminals spaced from each other, and an ejector revolving with the shaft at the said outlet between the said terminals, and receiving the material from both of the latter.

2. A polishing machine for grain and seeds, including a fixed cylinder having inlets at both sides of the center and having a central outlet at the top, a stand pipe through which the material passes from the said outlet, a relatively small shaft turning in the cylinder leaving an ample space in the cylinder to receive a mass of material between the shaft and cylinder, separate individual spiral flights on the cylinder shaft and oppositely disposed at each side of the center, those flights adjacent to the center being convergent but having their terminals spaced from each other, and an ejector on the shaft between the said terminals, said ejector consisting of a wheel presenting separate blades curved in the plane of rotation of the wheel, and wiping in succession past the said outlet with the turning of the shaft.

3. In a machine of the class described, a housing having a vertical inlet and having an inclined bottom and a partition dividing the housing into separate chambers, said chambers communicating by a passage adjacent to the said bottom, a vertical discharge spout leading from the bottom of one of said chambers and receiving material from the said inclined bottom, and means to produce an upward air current through said chamber and discharge spout, the other of said chambers surrounding the said vertical inlet and receiving the material issuing therefrom, to permit a loosening up of the material and an initial separation of the polished grains from the dust and chaff, uninfluenced by the air current in the second chamber.

4. A polishing machine of the class described, including a cylinder, having inlets at opposite sides of the center, and an outlet at the approximate center, a relatively small shaft turning in the cylinder, spiral elements on the shaft at each side of the center, there being a plurality of elements on the shaft at each side of the center and separated from each other, diametrically disposed bars on the shaft at each side of the center of the respective spiral elements, said bars presenting beveled side edges, the central spiral elements being convergent to constitute revoluble wedge surfaces, the adjacent terminals of the said central elements being separated, and an ejecting device disposed on the shaft at the said outlet between the said terminals.

HERMAN J. PIEPGRAS.

Copies of this patent may be obtained for five cents each, by addressing the "Commissioner of Patents, Washington, D. C."